United States Patent
Cole et al.

(10) Patent No.: US 11,928,554 B2
(45) Date of Patent: Mar. 12, 2024

(54) COMPARING RABI OSCILLATION STIMULATIONS

(71) Applicant: ColdQuanta, Inc., Boulder, CO (US)

(72) Inventors: Daniel C. Cole, Superior, CO (US); Woo Chang Chung, Boulder, CO (US)

(73) Assignee: ColdQuanta, Inc., Boulder, CO (US)

( * ) Notice: Subject to any disclaimer, the term of this patent is extended or adjusted under 35 U.S.C. 154(b) by 0 days.

(21) Appl. No.: 18/098,011

(22) Filed: Jan. 17, 2023

(65) Prior Publication Data

US 2023/0229954 A1 Jul. 20, 2023

Related U.S. Application Data

(60) Provisional application No. 63/300,462, filed on Jan. 18, 2022.

(51) Int. Cl.
*G06N 10/40* (2022.01)
(52) U.S. Cl.
CPC .................. *G06N 10/40* (2022.01)
(58) Field of Classification Search
USPC ......................................................... 716/100
See application file for complete search history.

(56) References Cited

U.S. PATENT DOCUMENTS

| | | |
|---|---|---|
| 2005/0001209 A1 | 1/2005 | Hilton |
| 2019/0393400 A1* | 12/2019 | Leipold .................. B82Y 10/00 |
| 2022/0197764 A1* | 6/2022 | Jun ........................ G06N 10/70 |

FOREIGN PATENT DOCUMENTS

WO 2021007560 1/2021

OTHER PUBLICATIONS

Anastasios Kyrillidis, Introduction to Quantum Computing: Bloch Sphere, Dec. 3, 2022.
Chu-Ryang Wie, Two-Qubit Bloch Sphere, submitted: Mar. 3, 2020; v2: Aug. 3, 2020), pp. 1-13.
Egger et al., Pulsed Reset Protocol for Fixed-Frequency Superconducting Qubits, pp. 1-7, Apr. 2, 2019.

* cited by examiner

*Primary Examiner* — Bryce M Aisaka
(74) *Attorney, Agent, or Firm* — Van Pelt, Yi & James LLP; Clifton Leon Anderson

(57) ABSTRACT

While a qubit control system (e.g., a laser system) is in a first configuration, it causes a qubit state (as represented as a point on the surface of a Bloch sphere) of a quantum state carrier (QSC), e.g., an atom, to rotate in a first direction from an initial qubit state to a first configuration qubit state. While the qubit control system is in a second configuration, it causes the QSC state to rotate in a second direction opposite the first direction from the first configuration qubit state to a second configuration qubit state. The second configuration qubit state is read out as a |0⟩ or |1⟩. Repeating these actions results in a distribution of |0⟩ s and |1⟩ s that can be used to determine which of the two configurations results in higher Rabi frequencies. Iterating the above for other pairs of configurations can identify a configuration that delivers the most power to the QSC and thus yields the highest Rabi frequency. This process can be used, for example, to align a laser so that its pulse yields a maximum Rabi frequency for an atom.

14 Claims, 6 Drawing Sheets

COMPARING RABI OSCILLATION STIMULATIONS

CROSS REFERENCE TO OTHER APPLICATIONS

This application claims priority to U.S. Provisional Patent Application No. 63/300,462 entitled SEQUENCE OF QUANTUM OPERATIONS FOR COMPARISON OF RABI FREQUENCIES FOR DIFFERENT PHYSICAL SETTINGS filed Jan. 18, 2022 which is incorporated herein by reference for all purposes.

BACKGROUND OF THE INVENTION

Whereas classical digital computers manipulate units, e.g., bits, of classical information, quantum computers manipulate units, e.g., qubits, of quantum information. Both classical bits and quantum qubits can be represented physically using two-state carriers. Examples of two-state quantum carriers include: a) electrons that can assume a spin-up basis state and a spin-down basis state; and b) electrons in atoms that transition between electron energy levels under the influence of lasers. A classical two-state carrier assumes one of the two states at any given time; a quantum two-state carrier can be in a coherent superposition of both basis states simultaneously. Herein, a "quantum state carrier" (QSC) is any physical system that can assume alternative basis states and superpositions of those basis states. Examples of QSCs include superconducting circuits, quantum dots in semiconductor hosts, color centers in a solid-state host (e.g., nitrogen-vacuum centers in diamond), neutral and charged atoms and molecules, electrons and photons.

A laser must be precisely aligned with a trapped atom to ensure maximum power delivery to the atom. If the laser frequency is resonant with a transition between energy levels of the atom, a laser pulse can be used to stimulate Rabi oscillations, the frequency of which can be measured: a higher Rabi frequency is associated with greater power delivery. Accordingly, various alignments can be tried and the resulting Rabi frequencies can be compared to determine the best alignment. However, during the span of time required to test, the laser power may drift, compromising the comparisons and making it difficult to achieve the desired alignment precision. What is needed is a method of laser alignment to a trapped atom that is not so subject to error due to laser power drift.

BRIEF DESCRIPTION OF THE DRAWINGS

Various embodiments of the invention are disclosed in the following detailed description and the accompanying drawings.

DETAILED DESCRIPTION

Figure 1:
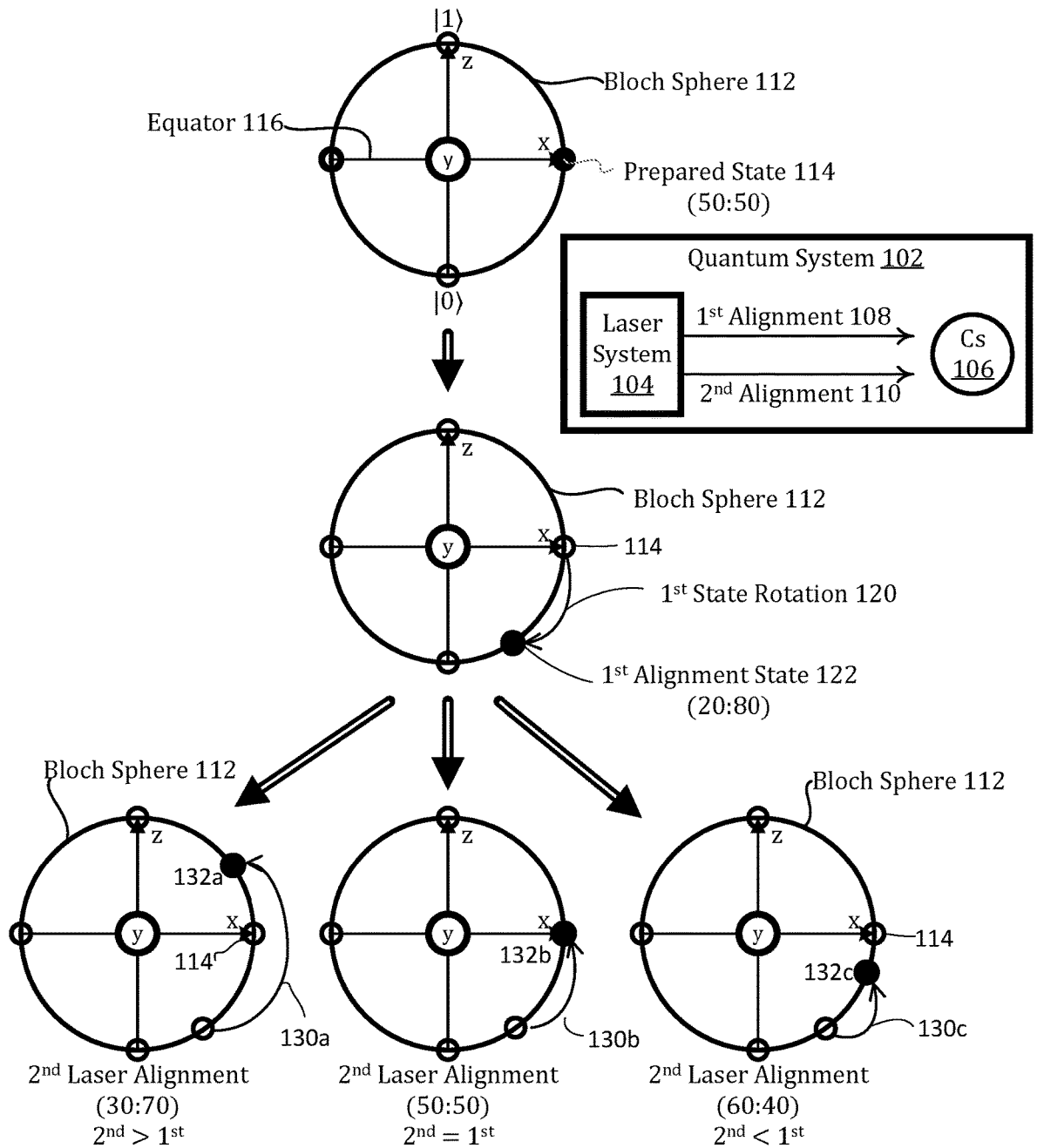
FIG. 1 is a flow diagram of a process for aligning a laser to a trapped atom.

The present invention provides for: 1) comparing the frequencies of Rabi oscillations stimulated by a qubit control system (QCS) using different QCS configurations; and, thus, 2) identifying a qubit control system configuration that provides for the highest Rabi frequencies and thus power delivery. The comparison involves using the QCS in a first configuration to rotate a qubit state in a first direction to a first configuration qubit state and then, using the QCS in a second configuration to rotate the qubit state in a second direction opposite to the first direction to a second configuration qubit state. The second configuration qubit state can be readout to provide a probabilistic indication of which configuration yielded the higher Rabi Frequency; these actions can be repeated to determine which configuration yielded the higher Rabi frequency and thus provided the greater power delivery. By iterating the comparison process for different pairs of qubit control configurations, a configuration that provided the greatest power delivery to yield highest Rabi frequency can be determined.

A qubit state is conventionally represented using a Bloch sphere. Points on the surface of the sphere represent possible qubit values, poles of the Bloch sphere correspond to possible results ($|0\rangle$ and $|1\rangle$) of an applicable qubit readout operator, latitude corresponds to the percentages of the basis qubit states $|0\rangle$ and $|1\rangle$ in a superposition of the basis qubit states and therefore also the probabilities of detecting $|0\rangle$ or $|1\rangle$ upon readout, and longitude corresponds to a phase relationship between the basis states in a superposition. Changes in qubit states can be characterized as rotations on the surface of the Bloch sphere. While this description uses Bloch sphere representations of qubit states throughout, the invention permits but does not require explicit use of a Bloch sphere.

Since each readout of the second configuration qubit state yields either a $|0\rangle$ or a $|1\rangle$ on a probabilistic basis, many comparisons with readouts can be required to reliably determine the configuration that yields the higher Rabi frequency, and many more repetitions will be required to compare enough pairs to identify a configuration that yields the highest Rabi frequency. This need to perform many repetitions of the same experiment, and then to iterate experiments over many different parameters, is a common feature of calibrations and measurements of quantum mechanical systems and is not unique to the present invention. During the course of all these repetitions, the QCS power may drift and Rabi frequencies yielded by a qubit control configuration can vary in concert with the power drift. However, as long as the power drift is negligible on the time scale of a single repetition, the comparison rankings (higher vs lower frequencies) do not change as the power drifts. Thus, the present invention provides valid rankings in cases in which methods based on absolute Rabi frequencies do not. However, some embodiments do consider reliable quantitative information when determining which configurations to compare and/or selecting the final configuration.

The present invention can be used to align a laser with an atom, e.g., in a qubit array, by comparing the accuracy of laser alignment configurations. A "laser alignment configuration", herein, is an arrangement of a laser and optical elements that collectively define the path of a laser beam. Instead of evaluating each alignment separately, the present invention evaluates comparisons that indicate which of two laser alignment configurations provides greater power to an atom. While laser power may drift over the course of many comparisons, the determination of which of two laser alignment configurations is better is not affected by the power drift, provided the drift is negligible over the duration of a single repetition. Accordingly, alignment configurations can be evaluated reliably.

A laser alignment comparison process 100, diagrammed in FIG. 1, can be applied to a quantum system 102, shown in the inset to FIG. 1. Quantum system 102 includes a laser system 104 and a trapped atom, e.g., a cesium 133 ($^{133}$Cs) atom 106. The objective of laser alignment comparison process 100 is to determine which of two alignments 108 and 110 for laser system 104 is "better" in that it provides more power to atom 106. A laser alignment comparison process can include subsequent sets of repetitions applied to other parings of alignments until a best overall alignment is determined for a given atom. The laser alignment comparison process can be repeated for other atoms, e.g., other atoms of a qubit array of cold atoms.

In general, process 100 compares state rotations (transitions) involving superpositions of a pair of energy states. In the case of atom 106, the energy states of interest can be two of the ground-state hyperfine levels of $^{133}$Cs, for example: $|6S_{1/2}, F=3, m_F=0\rangle$ and $|6S_{1/2}, F=4, m_F=0\rangle$. In the context of comparison process 100, the intended Bloch-sphere trajectories lie within an xz plane: with an initial qubit state lying along the x axis of the Bloch sphere. A first laser pulse rotates the superposition state in one direction, e.g., clockwise, around an equatorial y axis perpendicular to the initial state, and a second laser pulse rotates the superposition state in the opposite direction, e.g., counter-clockwise, around the same y axis. The reversal of direction is achieved by changing the laser phase.

As shown at the top of FIG. 1, Bloch sphere 112 has opposing poles associated with energy basis states $|0\rangle$ and $|1\rangle$. x, y, and z axes of a coordinate system are indicated, with the x axis lying in the plane of the equator. An initially prepared state 114 is depicted; this state is the so-called +1 eigenstate of the Pauli X operator and is an equal superposition of the $|0\rangle$ and $|1\rangle$ energy eigenstates with a +1 superposition phase. They axis is into the page, while the z axis extends through the Bloch sphere poles. Prepared qubit state 114 is a known state into which atom 106 has been prepared. For example, atom 106 can be prepared in a $|1\rangle$ qubit state through optical pumping and then rotated using a quantum gate to prepared qubit state 114.

Laser system 104 can apply a resonant pulse to atom 106, causing a qubit-state rotation 120 (e.g., in a clockwise direction) to a first alignment qubit state 122. As illustrated, first alignment state 122 is shown corresponding to a 20:80 distribution of eigenstates $|0\rangle$ and $|1\rangle$, respectively. In general, the transition can be to any superposition of eigenstates $|0\rangle$ and $|1\rangle$ in the plane normal to the rotation axis and the rotation can wrap around Bloch sphere 122 one or more times, i.e., the rotation can be around the y axis by more than 360 degrees.

While atom 106 is in first alignment qubit state 122, laser system 104 is switched to second alignment 110 and the laser phase is inverted, i.e., shifted by π. A second laser pulse is applied to atom 106, resulting in a second rotation from first alignment qubit state 122 to a second alignment qubit state. Since the laser phase has been inverted, the direction of the second rotation is opposite (e.g., counterclockwise) that of first rotation 120.

Three possible outcomes can be distinguished. In a scenario represented at the bottom left of FIG. 1, rotation 130a is from first alignment qubit state 122 past prepared qubit state 114 to a second alignment qubit state 132a. In the scenario represented at the bottom right of FIG. 1, a rotation 130c from first alignment qubit state 122 to a second alignment qubit state 132 falls short of prepared state 114. In a scenario represented at the bottom center of FIG. 1, a transition 130b is from first alignment qubit state 122 to second alignment qubit state 132b, which is equivalent to initial qubit state 114. Thus, qubit state 130a represents a case in which the second laser alignment 110 is better because it induced a larger rotation, qubit state 132c represents a case in which first laser alignment 108 is better, and qubit state 132b represents a case in which the alignments are equally good.

However, the positions of qubit states 132a, 132b, 132c cannot be known directly. Instead, a state selective measurement is taken, producing either a $|0\rangle$ or a $|1\rangle$ on a probabilistic basis according to the contributions of the basis states. Many repetitions of comparison process 100 can be used to compare two alignments. Ideally, these comparisons would yield a distribution from which the second alignment qubit state could be precisely determined. However, if the laser power drifts, the second alignment qubit state could vary between repetitions, making the state determination unreliable.

On the other hand, the direction (clockwise vs. counter-clockwise) of the second alignment state with respect to the prepared state would not be affected by a power drift on a timescale slower than one repetition. So, it is this direction relative to the known prepared qubit state that is determined. To facilitate this direction determination, the prepared state can be set to the Bloch sphere equator where the contributions of the eigenstates to the superposition are equal. The distribution resulting from multiple repetitions would then indicate whether the second alignment state is above or below the equator and thus whether the second alignment is worse or better than the first alignment, respectively. Other prepared states can be used, but the determination of which alignment is better can require additional computation or be less sensitive.

Process 100 does not consider the number of full rotations around the Bloch sphere undergone in each of the opposing directions. Some rough pre-alignment can be performed to ensure the alignments to be compared are at least close enough to avoid ambiguities that arise when different numbers of full-circle rotations are involved. Over the course of an alignment procedure composed of many comparisons of different alignment configurations, higher sensitivity can be obtained as the procedure approaches the optimal configuration by increasing the number of full Bloch-sphere rotations driven by each pulse in a configuration comparison.

Figure 2:
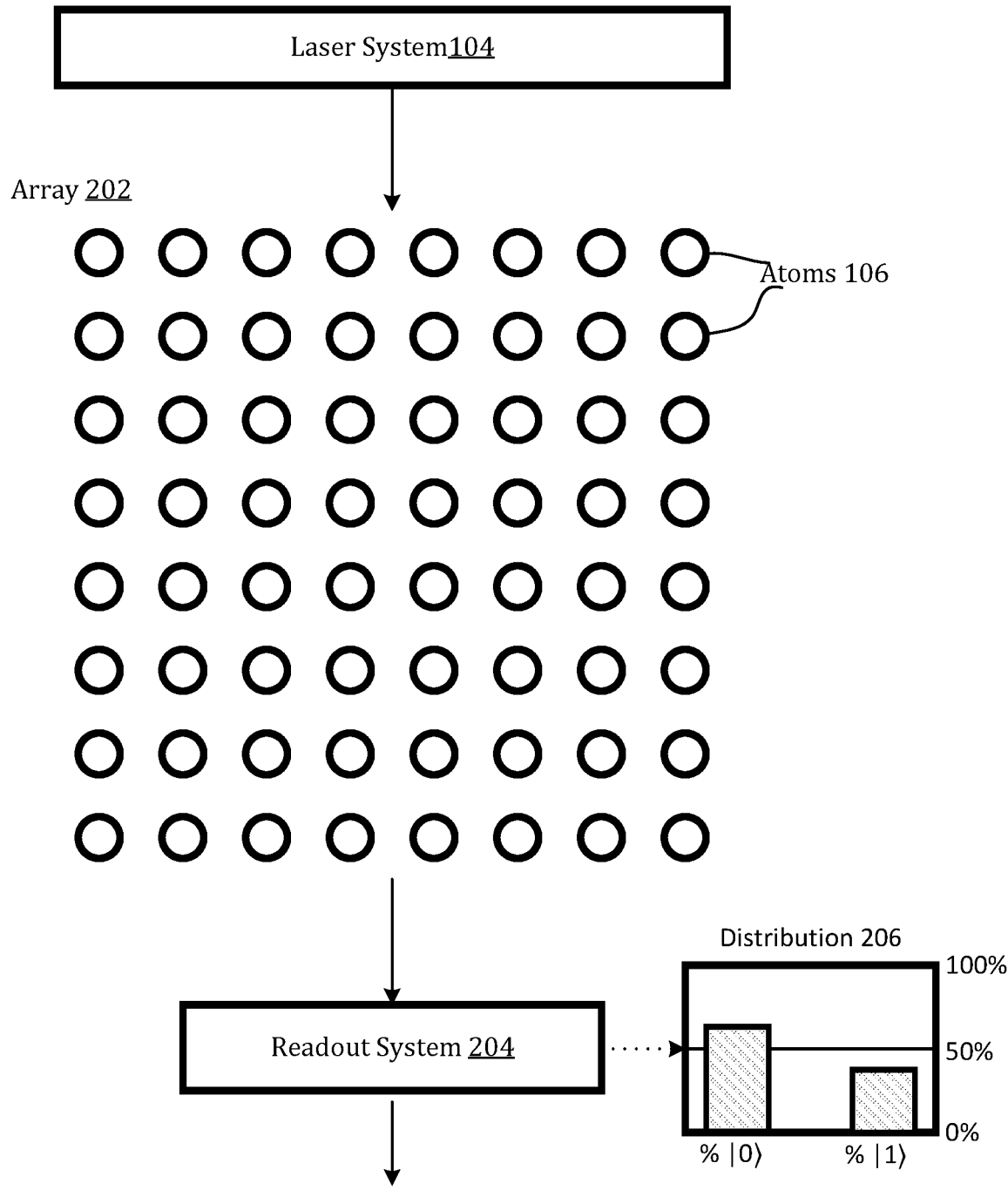
FIG. 2 is a schematic diagram of a system for aligning a laser to a trapped atom.

As shown in FIG. 2, quantum system 102 includes a laser system 104, an array 202 of atoms 106, and a readout system 204 for providing an output 206. As illustrated, the array is 8×8 atoms; other embodiments use arrays of different dimensions. Laser alignment is required for each atom in the array. The readout system can detect fluorescence resulting from irradiation of an atom in the array. A single repetition of comparison process 100 yields a single comparison. Multiple repetitions using the same pair of alignments can determine a better one of the two alignments. Multiple repetitions for each of multiple pairs of alignments can result in a best alignment determination.

Figure 3:
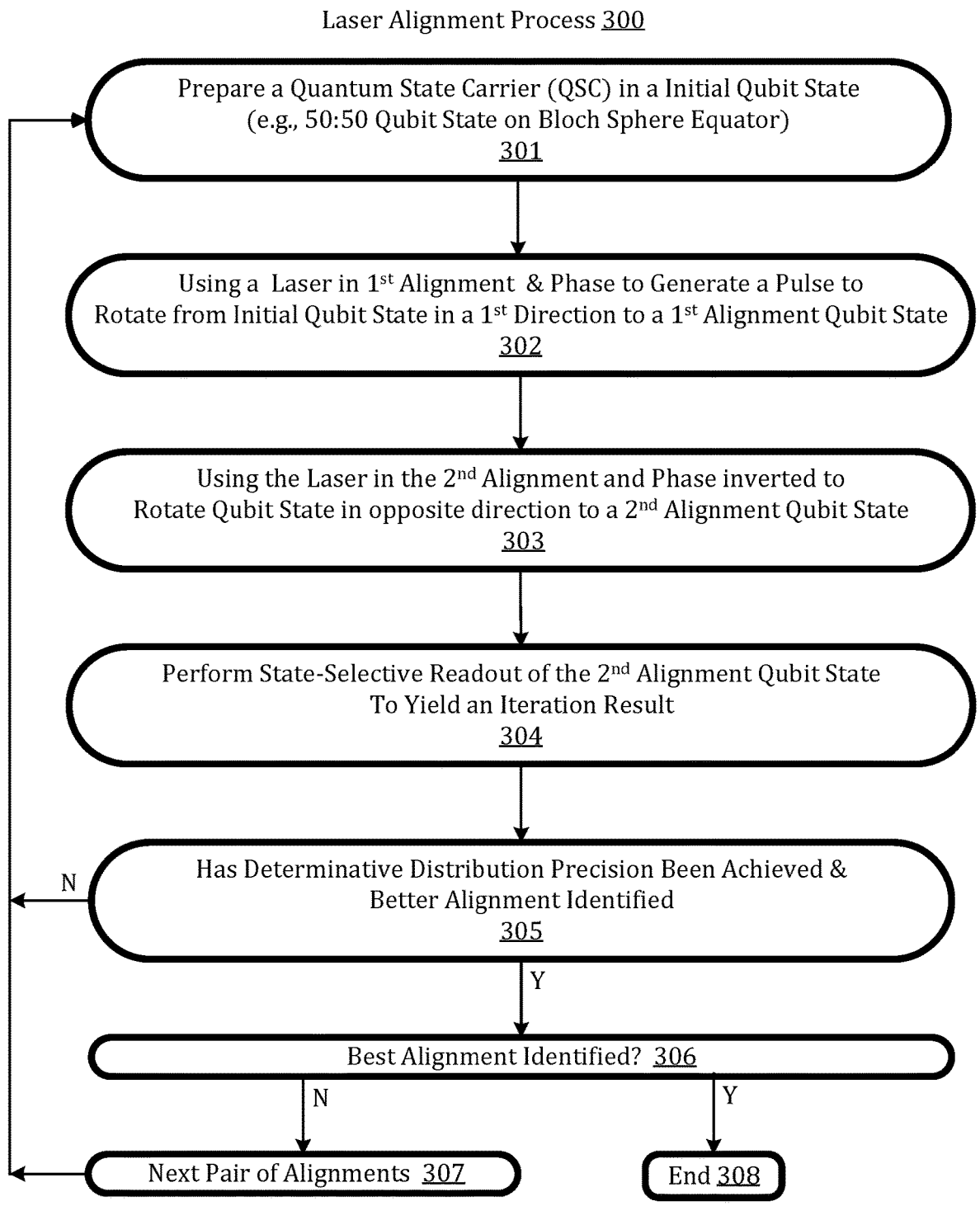
FIG. 3 is a flow chart of a laser alignment process including the comparison process of FIG. 1.

A laser alignment process 300 is flow charted in FIG. 3. At 301, an atom is prepared in a known qubit state, typically a 50:50 or other superposition state. For example, the atom can first be prepared in an eigenstate, e.g., a $|1\rangle$ state and then rotated using a Hadamard or other quantum gate to a 50:50 superposition of the $|0\rangle$ qubit state and the $|1\rangle$ qubit state. Other superposition states can be used, but the 50:50 states at the Bloch sphere equator are the most straightforward computationally and provide the most sensitive readout. The invention can be used to align two or more lasers to a QSC or QSC location, e.g., as can be required wherein 2-photon or higher-order transitions are involved.

At 302, a laser system in a first alignment and phase is used to generate a pulse to rotate the quantum state from the known qubit state to a first alignment qubit state. At 303, the laser is shifted to a second alignment and the phase is inverted relative to its phase during the first pulse; then a second pulse is emitted causing the atom to rotate from the first alignment qubit state to a second alignment qubit state. Since the laser phase has been inverted, the direction of this second rotation is opposite the direction of the first rotation, e.g., counterclockwise instead of clockwise.

At 304, the qubit state is measured; in the process, the qubit state collapses to the $|0\rangle$ qubit state or the $|1\rangle$ qubit state. The second laser alignment qubit state can be evaluated by using a state selective measurement. For example, the atom can be irradiated by a laser with such frequency that can be absorbed by the atom if and only if it is in one of the two hyperfine ground states and not in the other of the two hyperfine ground states. The evaluation output for a single shot (of first and second laser alignment pulses) can be binary, e.g., either a $|0\rangle$ qubit state or the $|1\rangle$ qubit state.

Since the readout is probabilistic, it must be repeated to provide a distribution that determines the better of the two alignments being compared. At 305, the readout becomes a data point in a basis state distribution. Actions 301-305 correspond to a repetition of laser alignment comparison process 100 of FIG. 1.

Actions 301-305 are repeated until, as determined at 306, the distribution reliably indicates whether: the second alignment qubit state is between the prepared qubit state and the first alignment state, in which case the first alignment is better; the prepared qubit state is between the first and second alignment qubit states, in which case, the second alignment is better, or whether the second alignment qubit state is equal to the prepared state, in which case the two alignments differ in quality at most negligibly.

In the implementation described so far, the two alignments of a pair being compared are applied in the same order from repetition to repetition. In other words, if the pair includes alignment A and alignment B, then, if alignment A is the first alignment during one repetition, it is first in all repetitions comparing alignments A and B. In another variation, alignment A is used first some repetitions comparing alignments A and B and alignment B is first in other repetitions comparing alignments A and B. For example, repetitions can alternate between beginning with alignment A and beginning with alignment B, with the first rotation always occurring in the same direction, e.g., clockwise. In this case, the sense of rotation under each setting A and B is reversed for these two different measurements. This variation allows direct comparison of two sets of data, instead of comparison of one set of data to a reference value that is assumed or independently established, and which depends on the rotation angle of the initial pulse that intends to map to the equator. Accordingly, this alternating-orders variation is robust against errors in mapping to the Bloch sphere equator.

Once a sufficiently precise distribution is achieved at 306, at 307 a next pair of alignments is selected for comparison using a next set of repetitions of actions 301-306. Depending on the comparison procedure, the next comparison may or may not include the "winner" of the previous comparison. Once all the needed comparisons are completed, and the desired alignment achieved, process 300 ends at 308. Actions 301-308 can be repeated for other atoms (or other QSCs).

Figure 4A:
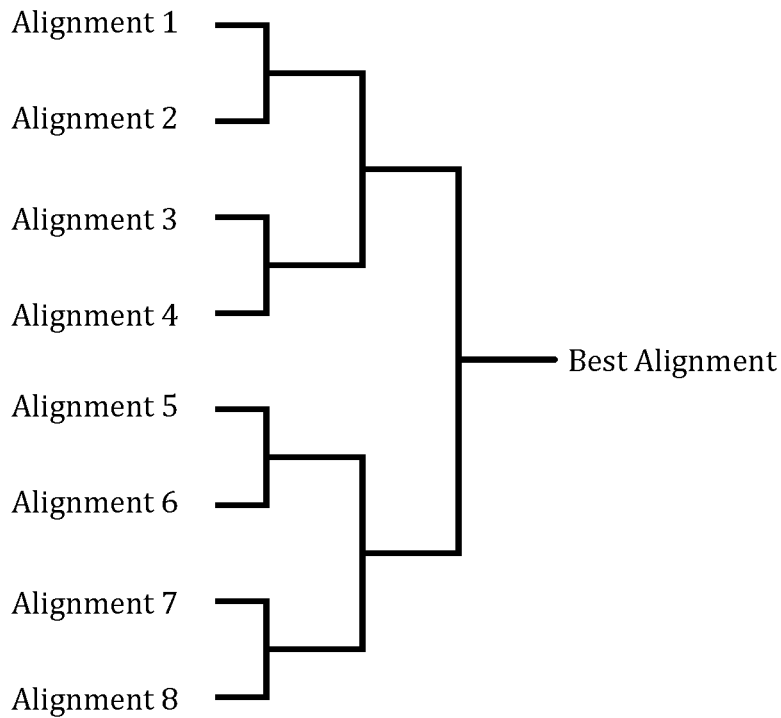
FIG. 4A is a chart of a bracket system for identifying a laser alignment that stimulates Rabi oscillations of the highest frequency.

One approach to selecting a next comparison is to follow a tournament bracket 400 as shown in FIG. 4A. For example, the possible alignment positions can be conceptually arranged in pairs and comparisons can be made for each of the four pairs as shown in FIG. 4A. The four winners can be arranged in two pairs, and then each of those pairs can be compared to select two finalists. Then the two finalists can be compared to determine a best alignment for the given atom in an array. The tournament approach can accommodate any finite number of alignments and multiple variations in the order in which the comparisons are carried out. This approach may facilitate identification of a globally optimal alignment configuration at the cost of more comparisons.

Figure 4B:
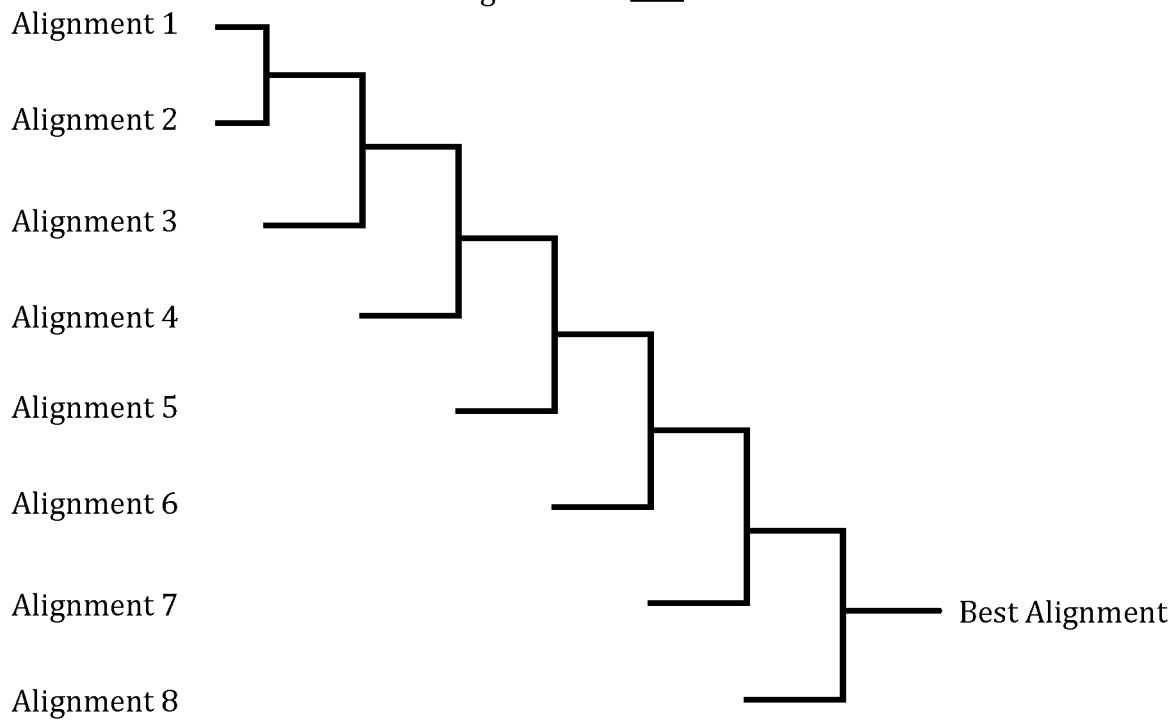
FIG. 4B is a chart of a challenger system for identifying a laser alignment that stimulates Rabi oscillations of the highest frequency.
Figure 5:
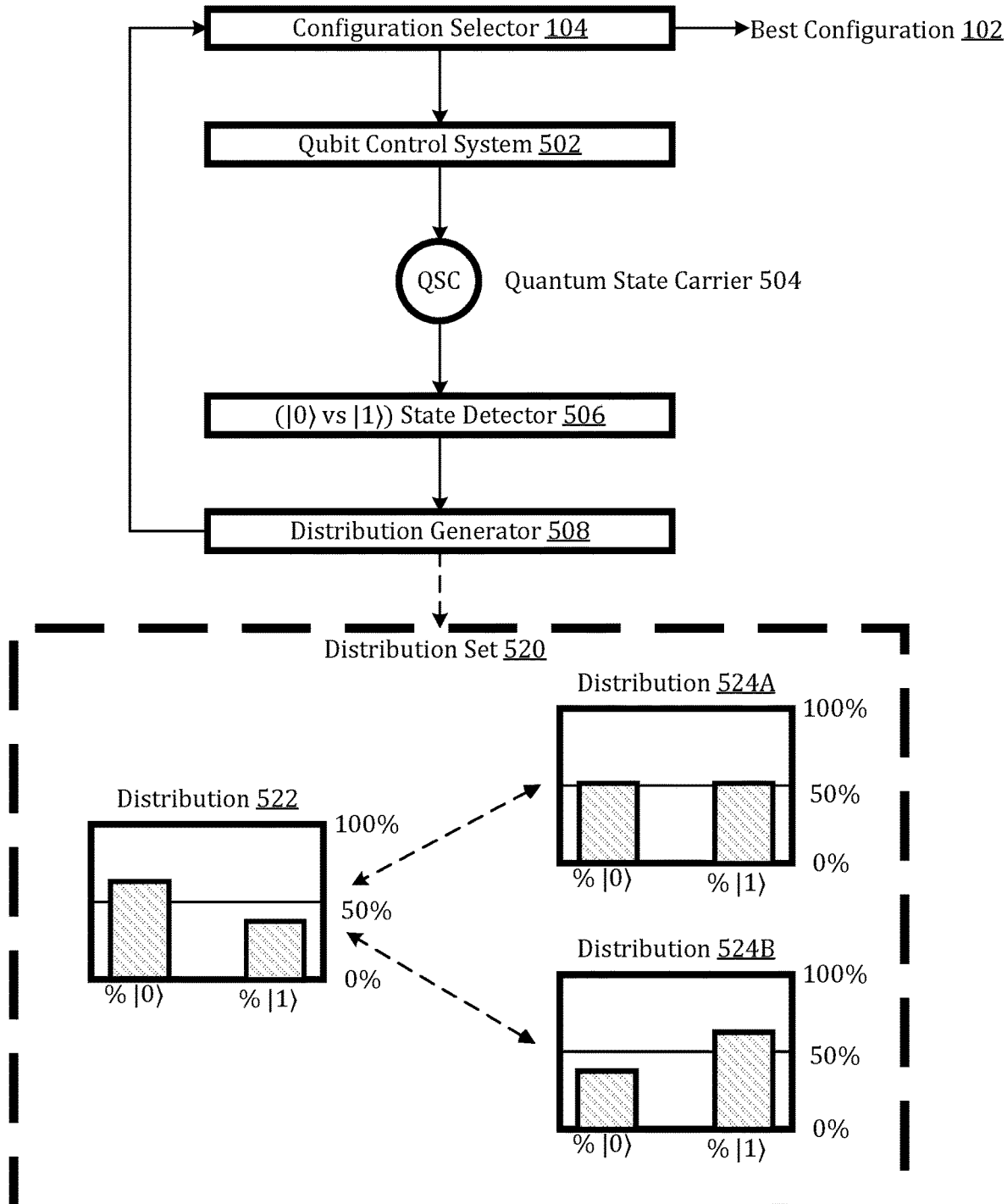
FIG. 5 is a schematic illustration of a Rabi oscillation stimulation comparison system.
Figure 6:
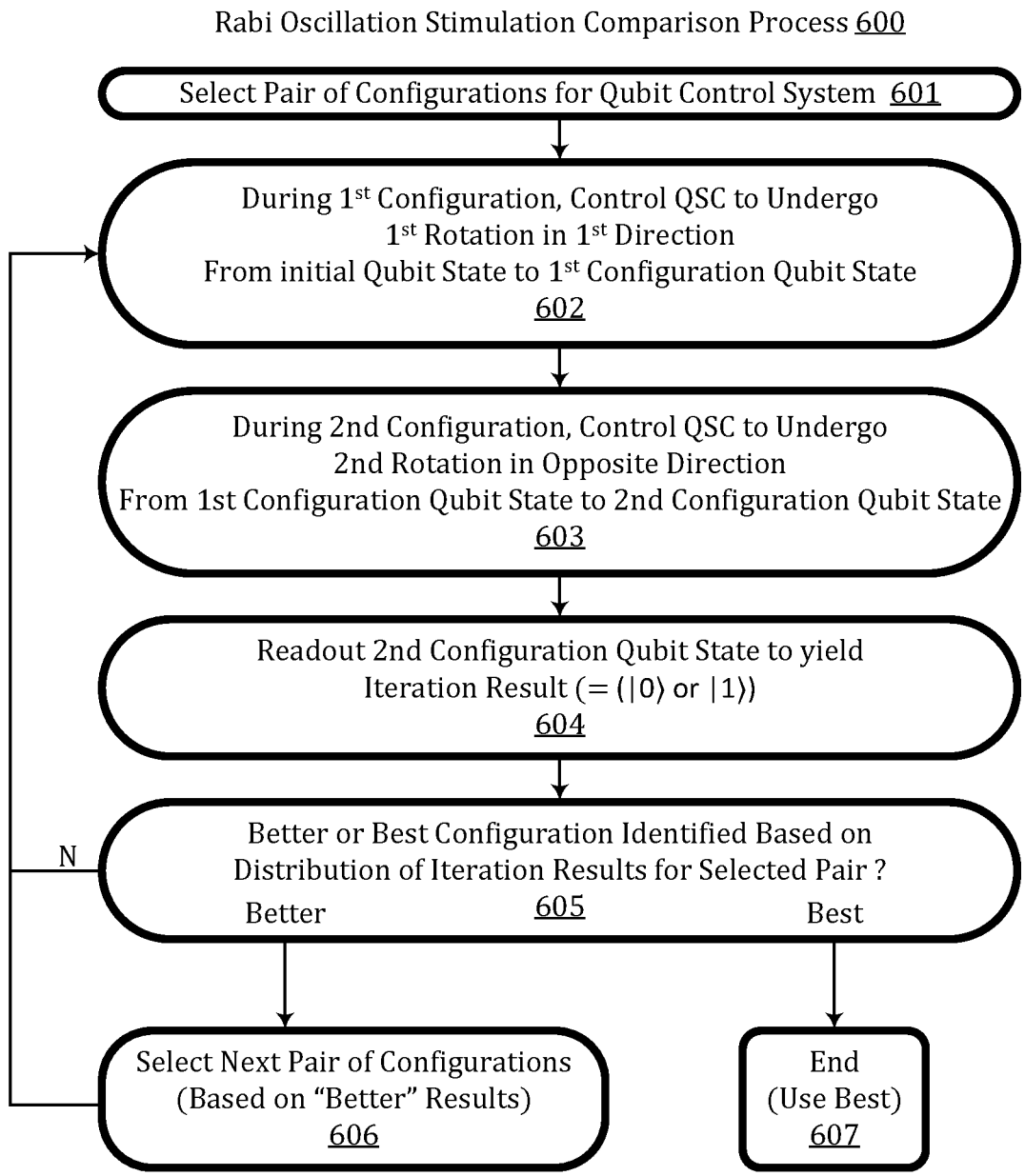
FIG. 6 is a flow chart of a Rabi oscillation stimulation comparison process.

The tournament approach efficiently compares all possible configurations to identify an optimal configuration. However, the tournament approach may not be practical when the number of possible configurations is very large or infinite (e.g., analog). Where the possible configurations form a continuum or quasi-continuum, there are challenger approaches that can be more efficient and robust than the tournament approach. In a challenger approach, such as the one depicted in FIG. 4B, the winner of each comparison (or winners of several comparisons) move(s) on to the next challenger, which can be selected based on prior comparisons. Because not all configurations need to be compared, the challenger approach can be more feasible and efficient than the bracket approach. Also, some threshold can be used to determine when to stop accepting new challengers, e.g., a threshold based on diminishing returns or a desired precision. In practice, there are many well characterized challenger approaches, for example, those using the Nelder-Mead simplex search algorithm.

Depending on the embodiment the final configuration determined by a process for comparing alignments or other configurations may or may not be one of the configurations compared. For example, the final comparison involves two configurations that result in matching Rabi frequencies, the final configuration may be derived, e.g., by interpolation between the compared configurations. The interpolated configuration can be selected as the final configuration even though it was not compared.

The present invention can be used to align a laser to an atom or other QSC or to a location of repeated trapping of atoms of the same species by using two of the atom's stable or metastable energy levels as a qubit and driving Rabi oscillations between the qubit levels using the laser radiation. To avoid ambiguities associated with multiple cycles about a Bloch sphere, the laser has been coarsely pre-aligned to the atom by some other means. The invention is a particular sequence of quantum operations that allows for comparison of the Rabi frequency under two different laser alignment settings A and B. The invention is distinguished from prior methods by the fact that both alignment settings are used in a single shot, that is there is one readout per pair of opposing rotations.

When the qubit state can be mapped to the equator of the Bloch sphere with high confidence at 301, FIG. 3, then this measurement sequence can be repeated until the statistics obtained allow a determination of the difference between the $|0\rangle$ (or $|1\rangle$) population after the pulse sequence and 50%. The sign and magnitude of this difference indicate which alignment setting is better and by how much. Note that additional information is required to answer the latter question unambiguously, but the techniques for accomplishing this are well established—for example, the rotation angles for the laser pulses applied at 302 and 303 can be approximately determined by measuring Rabi oscillations in a standard way.

The duration of the laser pulses that perform the y axis rotations should be set so that good sensitivity to Rabi frequency differences is achieved. This means that the pulses should not be too short. Additionally, ambiguity in the signal should be avoided. This means that the magnitude of the difference in rotation angle for the two settings (arising from different Rabi frequencies and the same pulse duration) should be significantly smaller than $\pi/2$. This means that the pulses should not be too long.

The concept for this pulse sequence can also be applied to operations that rotate around the Bloch sphere's z axis, instead of an axis in the equatorial plane. For example, z-axis rotations can be driven by differential light shifts applied by laser radiation that is near-resonant with the $^{133}$Cs $|6S_{1/2}\rangle \leftrightarrow |7P_{1/2}\rangle$ transition. Actions 301-304 are performed as described above, except that it is rotations around the z axis in opposite directions that are driven at 302 and 303, instead of rotations around the y axis in opposite. Then action 304 includes another $\sim\pi/2$ rotation around an equatorial axis that is separated from the initial equatorial axis of rotation by 90° before state-selective readout; this axis of rotation should correspond to a Pauli operator of which the initial equatorial state is an eigenstate. This converts the displacement between the states corresponding to the two configurations from a separation in azimuthal angle to a separation in polar angle, enabling measurement of the separation through the same standard readout procedure described above. As in the alternating variation described above, sets of data can be acquired for two different senses of rotation for the final $\pi/2$ pulse and compared, and this eliminates the need for a reference value. This application relies on high-fidelity mapping to the equator of the Bloch sphere, which can be accomplished using established techniques.

The invention can be also used in precise alignment of magnetic field orientation to the electromagnetic field polarization direction. There are situations where the Rabi frequency of a transition is maximized by making the field polarization collinear with the magnetic field orientation. Without loss of generality, assume that the magnetic field orientation is oriented towards the z-axis. Then by modifying the transverse x- and y-magnetic field strengths, one can finely adjust the relative orientation of the magnetic field to the external field polarization using the Rabi frequency comparison process.

This invention can be used in any context in which Rabi frequencies arising from different physical settings should be compared, as long as the settings can be varied on the timescale of a single shot (which may be limited by other error mechanisms, e.g., T1 and T2 times). Other applications can involve other types of QSCs, e.g., superconducting circuits, quantum dots in semiconductor hosts, color centers in a solid-state host (e.g., nitrogen-vacuum centers in diamond).

Herein, a "quantum particle" is a molecular entity, e.g., an atom or molecule, capable of assuming different quantum states, at least in the relevant contexts. Herein, a "molecular entity" is "any constitutionally or isotopically distinct atom, molecule, ion, ion pair, radical, radical ion, complex, conformer, etc., identifiable as a separately distinguishable entity" (IUPAC, Compendium of Chemical Terminology, 2nd ed. (the "Gold Book") (1997). In other words, a molecular entity is any singular entity, irrespective of its nature, used to concisely express any type of chemical particle that can exemplify some process: for example, atoms, molecules, ions, etc. can all undergo a chemical reaction.

Examples of quantum particles of particular interest herein, are $^{133}$Cs atoms, and other alkali metal and alkaline earth metal atoms. Examples of physical representations of qubit basis states can include different hyperfine ground level or other states for the quantum particle. "Quantum-state carrier" (QSC) encompasses quantum particles as well as more complicated physical systems, including a macroscopic one, that may host a qubit as an abstract computational entity.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

Herein, "quantum state" encompasses unit vectors in a finite-dimensional Hilbert space and physical realizations thereof. A "qubit" is the space spanned by two basis vectors of such a Hilbert space, and a physical realization thereof. A "laser alignment configuration", aka, "laser system alignment", is a configuration of a laser and optical elements (including steering elements) that can affect the direction of a laser beam generated by the laser.

A "better alignment configuration" is one of two that provides for a higher Rabi frequency and a greater qubit state change. For example, the initial qubit state can be at the Bloch sphere equator (corresponding to equal portions of the

|0⟩ quantum state and the |1⟩ quantum state). The atom can be initially prepared in the |1⟩ qubit state and then rotated to the equator using a quantum gate. When the second configuration qubit state is between the known prepared qubit state and the first configuration qubit state on the Bloch sphere, the first configuration qubit state is the "better" (i.e., yields a higher Rabi frequency and delivers more power) configuration. When the initial qubit state is between the first and second configuration qubit states, the second configuration qubit state is better. If the second configuration qubit state matches the known prepared qubit state (or has the same Bloch sphere latitude as the initial state), then no difference in quality has been detected between the first and second configurations. A configuration that is better than all other compared configurations for the same QSC or QSC location is a "best configuration".

Herein, a "great circle" is the circular intersection of a sphere and a plane passing through the sphere's center point. Herein, "clockwise" is the direction the hands move on an analog clock, and counterclockwise is the opposite rotational direction. Whether a rotation is clockwise or counterclockwise depends on the perspective. However, given a perspective in which one direction is clockwise, the opposite direction is counterclockwise. Herein, a "state rotation" refers to a state transition that would be represented on a Bloch sphere as a rotation.

Herein, all art labelled "prior art", if any, is admitted prior art. All art not labelled "prior art" is not admitted prior art. The described embodiments, variations thereupon and modification thereto are provided for by the present invention, the scope of which is defined by the following claims.

What is claimed is:

1. A Rabi frequency comparison process comprising:
   a) selecting a pair of configurations for a qubit control system;
   b) while the qubit control system is in a first configuration of the pair, controlling a quantum state carrier (QSC) so that a qubit state of the QSC rotates in a first direction from an initial qubit state to a first configuration qubit state;
   c) while the qubit control system is in a second configuration of the pair, generating a field that causes the qubit state of the QSC to rotate so that the qubit state of the QSC rotates in a second direction opposite the first direction from the first configuration qubit state to a second configuration qubit state;
   d) reading out the second configuration qubit state to yield a readout result; and
   e) repeating actions b-d to obtain a distribution set of one or more distributions of readout results to determine which configuration of the pair yields a higher Rabi frequency.

2. The Rabi frequency comparison process of claim 1, further comprising:
   f) iterating actions a-e for different pairs of configurations for the qubit control system so as to obtain respective distribution sets of one or more distributions of readout results; and
   g) determining, based on the respective distribution sets, a final configuration.

3. The Rabi frequency comparison process of claim 2, wherein the final configuration yields a Rabi frequency at least as high as any of the configuration compared during action f.

4. The Rabi frequency comparison process of claim 1, wherein the first direction is the same one of the pair across all repetitions of actions b-d.

5. The Rabi frequency comparison process of claim 4, wherein the initial qubit state is a known qubit state and action f includes comparing a distribution of repetition results with the known qubit state.

6. The Rabi frequency comparison process of claim 1, wherein the pair includes a configuration A and a configuration B, and
   for a first set of repetitions of action sequence b-d, while the qubit control system is in the configuration A, the qubit state of the QSC rotates clockwise, and while the qubit control system is in configuration B, the qubit state of the QSC rotates counterclockwise; and
   for a second set of repetitions of action sequence b-d, while the qubit control system is in the configuration B, the qubit state of the QSC is rotated clockwise, and while the qubit control system is in the configuration A, the qubit state of the QSC is rotated counterclockwise.

7. The Rabi frequency comparison process of claim 6, wherein action e includes comparing a first distribution of results from the first set of repetitions with a second distribution of results from the second set of repetitions.

8. The Rabi frequency comparison process of claim 1, further comprising rotating the second configuration qubit state prior to the reading out the second configuration qubit state.

9. The Rabi frequency comparison process of claim 1, wherein the first and second direction are along an equator;
   the first and second directions are along a Block sphere equator; and
   the reading out includes rotating the second configuration qubit state about an axis through the initial qubit state.

10. The Rabi frequency comparison process of claim 1, wherein the qubit control system generates electro-magnetic fields and the QSC is an atom.

11. The Rabi frequency comparison process of claim 10, wherein the electro-magnetic fields include a laser beam and the atom is an alkali or alkaline-earth metal atom.

12. The Rabi frequency comparison process of claim 10, wherein a phase of a laser beam emitted while the qubit control system is in the second configuration is inverted with respect to the phase of the laser beam emitted while the qubit control system is in the first configuration.

13. The Rabi frequency comparison process of claim 10, wherein the initial qubit state corresponds to a point along an equator of a Bloch sphere.

14. The Rabi frequency comparison process of claim 1, wherein the first and second directions are along a great circle on a surface of a Bloch sphere that passes through poles of the Bloch sphere.

* * * * *